United States Patent
Liu et al.

(10) Patent No.: US 12,219,496 B2
(45) Date of Patent: Feb. 4, 2025

(54) POWER CONTROL PARAMETERS INDICATION

(71) Applicant: ZTE Corporation, Guangdong (CN)

(72) Inventors: Xing Liu, Guangdong (CN); Yu Ngok Li, Guangdong (CN); Peng Hao, Guangdong (CN); Jian Li, Guangdong (CN); Kai Xiao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 142 days.

(21) Appl. No.: 17/403,553

(22) Filed: Aug. 16, 2021

(65) Prior Publication Data

US 2021/0377872 A1    Dec. 2, 2021

Related U.S. Application Data

(63) Continuation of application No. PCT/CN2019/075219, filed on Feb. 15, 2019.

(51) Int. Cl.
*H04W 52/14*    (2009.01)

(52) U.S. Cl.
CPC ................ *H04W 52/146* (2013.01)

(58) Field of Classification Search
CPC ... H04W 52/146; H04W 52/08; H04W 52/10; H04W 52/243; H04W 52/281; H04W 52/48; H04W 52/58; H04W 52/14; H04W 52/54; H04W 52/34; H04W 52/367; H04W 52/04; H04W 52/36; H04W 24/02; H04W 88/02; H04W 52/18; H04W 52/346; H04W 72/23; H04W 52/12; H04W 74/006; H04W 52/143; H04W 74/004; H04W 52/06; H04W 52/545; H04W 52/248; H04W 52/38; H04W 52/0206

See application file for complete search history.

(56) References Cited

U.S. PATENT DOCUMENTS

| | | | |
|---|---|---|---|
| 8,588,186 B1 * | 11/2013 | Choi ................ | H04W 52/04 370/333 |
| 9,794,887 B2 * | 10/2017 | Ouchi ............... | H04W 52/242 |
| 9,907,032 B2 | 2/2018 | Wang | |
| 10,333,671 B2 | 6/2019 | Seo et al. | |
| 11,553,437 B2 * | 1/2023 | Iwai ................. | H04W 52/18 |

(Continued)

FOREIGN PATENT DOCUMENTS

| CN | 101383639 A | 3/2009 |
|---|---|---|
| CN | 104509180 A | 4/2015 |

(Continued)

OTHER PUBLICATIONS

European Search Report for EP Patent Application No. 19915197.8, dated on Feb. 16, 2022, 13 pages.

(Continued)

*Primary Examiner* — Lana N Le
(74) *Attorney, Agent, or Firm* — Perkins Coie LLP

(57) ABSTRACT

Methods, systems, and devices related to digital wireless communication are described. An illustrative method of wireless communication includes indicating, by a communication device, power control information based on a plurality of parameter sets via downlink control information (DCI). The power control information is used for indicating transmission power on a resource, and the plurality of parameter sets are predefined for the resource.

12 Claims, 9 Drawing Sheets

(56) References Cited

U.S. PATENT DOCUMENTS

| | | | | |
|---|---|---|---|---|
| 11,700,607 | B2* | 7/2023 | Matsumura | H04W 72/23 |
| | | | | 455/522 |
| 2006/0079264 | A1* | 4/2006 | Gu | H04W 52/12 |
| | | | | 455/69 |
| 2014/0269454 | A1* | 9/2014 | Papasakellariou | H04W 52/34 |
| | | | | 370/280 |
| 2016/0242125 | A1 | 8/2016 | Lee et al. | |
| 2017/0019882 | A1* | 1/2017 | Nimbalker | H04W 74/02 |
| 2019/0075526 | A1* | 3/2019 | Nagaraj | H04W 52/242 |
| 2019/0373559 | A1* | 12/2019 | Davydov | H04W 52/146 |
| 2020/0280934 | A1* | 9/2020 | MolavianJazi | H04W 52/10 |
| 2020/0305187 | A1* | 9/2020 | Takeda | H04W 74/006 |
| 2020/0314770 | A1* | 10/2020 | Wu | H04W 52/281 |
| 2020/0395991 | A1* | 12/2020 | Ryu | H04W 72/23 |
| 2021/0007060 | A1* | 1/2021 | Chen | H04W 52/243 |
| 2021/0058193 | A1* | 2/2021 | Zhang | H04W 52/146 |
| 2021/0250870 | A1* | 8/2021 | Iwai | H04W 52/146 |
| 2022/0095238 | A1* | 3/2022 | Huang | H04W 52/367 |
| 2022/0322358 | A1* | 10/2022 | Zhou | H04W 72/23 |

FOREIGN PATENT DOCUMENTS

| | | | |
|---|---|---|---|
| CN | 107306454 A | 10/2017 | |
| CN | 107439047 A | 12/2017 | |
| CN | 108605298 A | 9/2018 | |
| CN | 108924920 A | 11/2018 | |
| EP | 2849517 A1 | 3/2015 | |
| EP | 2830368 A1 | 1/2018 | |
| WO | 2010/148034 A | 12/2010 | |
| WO | 2012/008773 A3 | 5/2012 | |
| WO | WO-2017146773 A1 * | 8/2017 | ............ H04W 52/40 |

OTHER PUBLICATIONS

Huawei et al., "PUSCH reliability for URLLC," 3GPP TSG RAN WG1 Meeting #93, R1-1806902, Busan, Korea, May 21-25, 2018, 5 pages.

Zte et al., "Remaining issues on NR power control in non-CA aspects," 3GPP TSG RAN WG1 Meeting #92bis, R1-1803916, Sanya, China, Apr. 16-20, 2018, 10 pages.

International Search Report and Written Opinion mailed on Nov. 6, 2019 for International Application No. PCT/CN2019/075219, filed on Feb. 15, 2019 (6 pages).

Korean office action issued in KR Patent Application No. 10-2021-7029404, dated Apr. 28, 2023, 6 pages. English translation included.

Korean office action issued in KR Patent Application No. 10-2021-7029404, dated Sep. 27, 2023, 6 pages. English translation included.

Vietnamese examination report issued in VN Patent Application No. 1-2021-05615, dated Aug. 14, 2023, 3 pages. English translation included.

International Preliminary Report on Patentability issued in International Patent Application No. PCT/CN2019/075219, dated Aug. 10, 2021, 4 pages.

Chinese office action issued in CN Patent Application No. 201980092110.6, dated Jan. 6, 2024, 11 pages. English translation included.

European Communication pursuant to Article 94(3) EPC issued in EP Patent Application No. 19915197.8, dated Feb. 26, 2024, 5 pages.

Co-Pending Korean Application No. 10-2021-7029404, Korean Office Action dated Oct. 21, 2022, 7 pages with unofficial translation.

Indonesian Notification on Substantive Examination Result issued in ID Patent Application No. P00202110754, dated Feb. 20, 2024, 4 pages. English translation included.

Chinese Notification to Complete Formalities of Registration issued in CN Patent Application No. 202310803271.X, dated May 29, 2024, 4 pages. English translation included.

Chinese office action issued in CN Patent Application No. 202310803271.X, dated Mar. 7, 2024, 9 pages. English translation included.

Chinese office action issued in CN Patent Application No. 201980092110.6, dated Aug. 26, 2024, 13 pages. English translation included.

Nokia et al., "Discussion on NR power control framework," 3GPP TSG RAN WG1 Meeting NR#3, R1-1716127, Nagoya, Japan, Sep. 18-21, 2017, 4 pages.

Indonesian office action issued in ID Patent Application No. P00202110754, dated Oct. 18, 2024, 4 pages. English translation included.

Korean office Action issued in KR Patent Application No. 10-2023-7045079, dated Nov. 22, 2024, 8 pages. English translation included.

* cited by examiner

600A

601: Indicating, by a communication device, power control information based on a plurality of parameter sets via downlink control information (DCI)

603: indicating one selected parameter set from the plurality of parameter sets

605: indicating the power control information based on the selected parameter set

602 — Defining, by a communication device, a plurality of control parameter sets

604 — Selecting one of the plurality of control parameter sets based on an availability of transmission resources

606 — Using Downlink Control Information (DCI) to indicate power control information based on the selected one of the control parameter sets

FIG. 6B

POWER CONTROL PARAMETERS INDICATION

CROSS-REFERENCE TO RELATED APPLICATIONS

This application is a continuation of and claims priority to International Patent Application No. PCT/CN2019/075219, filed on Feb. 15, 2019, the contents of which are incorporated herein by reference in their entirety.

TECHNICAL FIELD

This patent document is directed generally to digital wireless communications.

BACKGROUND

When transmitting an uplink service in the communication system, services with different transmission delay reliability requirements may be transmitted differently. For example, the service with lower reliability can be preempted by the service with higher reliability. As another example, it may take a longer latency for transmitting the service with lower reliability. For the service with higher reliability, the system can increase its transmission power (e.g., in some overlapping resources) so as to improve transmission reliability.

BRIEF SUMMARY

This document relates to methods, systems, and devices related to digital wireless communication, and more specifically, to mechanisms for indicating uplink retransmissions. In one exemplary aspect, a method of wireless communication is disclosed. The present method includes, for example, indicating, by a communication device, power control information based on a plurality of parameter sets via downlink control information (DCI). The power control information is used for indicating transmission power on a resource, and the plurality of parameter sets are predefined for the resource.

In another exemplary aspect, an apparatus for wireless communication that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

BRIEF DESCRIPTION OF THE DRAWINGS

FIGS. 6A and 6B are flowcharts for example methods of wireless communication.

DETAILED DESCRIPTION

Figure 1:
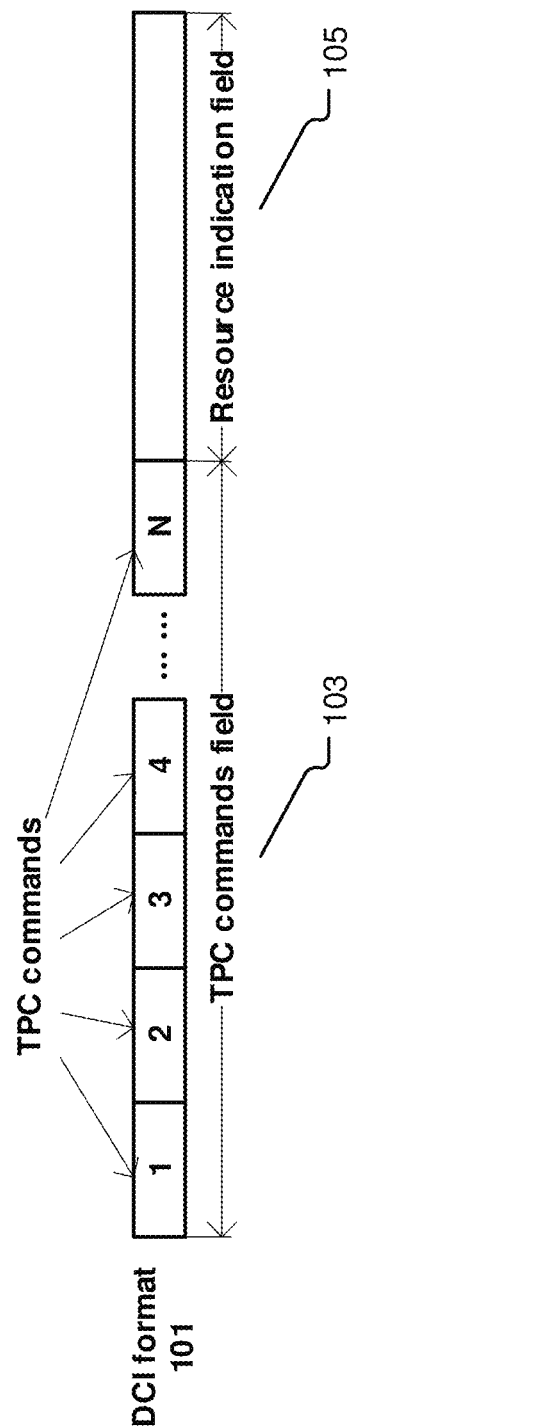
FIG. 1 illustrates an example DCI in accordance with some embodiments.

The technology and examples of implementations in this document can be used to improve performance in multiuser wireless communication systems. The term "exemplary" is used to mean "an example of" and, unless otherwise stated, does not imply an ideal or a preferred embodiment. Section headers are used in the present document to facilitate understanding and do not limit the disclosed technology in the sections only to the corresponding section. In the description, some terminology from the 5G standards is used only to facilitate understanding and the techniques described in the present document are applicable to other wireless systems and protocols that are different from the 5G standard currently published by the 3GPP organization.

The disclosed technology is directed to methods for implementing uplink service multiplexing based on power control. The methods effectively integrate existing and new service-based power control modes.

This disclosed technology provides methods and systems for indicating power control parameters, which define a power control downlink control information (DCI) format compatible with resource multiplexing. The disclosed technology can be effectively implement grant-free and grant-based uplink transmission multiplexing, thereby improving resource utilization efficiency. The grant-free uplink transmission represents transmission using PUSCH with a configured grant, i.e. PUSCH transmission on a configured grant resource. The grant-free resource can also be called as a configured grant resource. The terms grant-free resource and grant-free transmission are used in the following description.

Demands for the fourth-generation mobile communication technology ((e.g., 4G, Long Term Evolution (LTE, Long-Term Evolution) and Advanced Long-Term Evolution (LTE-Advance/LTE-A)) and the fifth-generation mobile communication technology (5G, 5th Generation mobile communication technology) are increasing. From observing the current trend, both the 4G and 5G systems include characteristics for supporting enhanced mobile broadband, ultra-high reliability, ultra-low latency transmission, and massive connectivity.

In order to support the characteristics of ultra-high reliability and ultra-low latency transmission, low-latency and high-reliability, services need to be transmitted with a short transmission time. At the same time, other services with longer transmission times that have not been transmitted or are being transmitted can be preempted. Because the occurrence of a preemptive transmission may not be understood by different user devices (UEs) of the uplink transmission, in order to minimize the performance impact on the service with high reliability and low latency, the preemption indication information should be notified to the preempted transmission user device. Accordingly, an isolated service or an uplink transmission with a lower reliability service can be cancelled or stopped, thereby avoiding simultaneous transmission on the same resource with low latency and high reliability, which may result in performance degradation.

Currently, for a downlink service preemptive transmission, a solution is provided by dividing downlink resources into 14 blocks, which can be shown by {M, N}={14, 1} or {7, 2}, when configuring reference downlink resources. "M" represents the number of partitions in the time domain, and "N" represents the number of partitions divided in the frequency domain. To notify whether a block is preempted or occupied, a 14 bit-bitmap can be used. As for uplink transmission, however, currently there is no effective way to address indication of preemptive transmission.

In some embodiments, the uplink transmission includes two types: grant-based uplink transmission and grant-free uplink transmission. The grant-based uplink transmission refers to uplink service transmission performed by user devices based on uplink authorization by a base station, and the corresponding transmission resources are determined. The grant-free uplink transmission refers to embodiments where user devices independently select uplink service transmission from a set of grant-free resources that are semi-statically configured. For this type of transmission, the base station cannot predetermine which candidate resource can be used for a specific transmission. Therefore, when the grant-free uplink transmission overlaps with other low-priority transmission resources, the base station cannot notify the preempted user device in advance. As a result, the preemption indication is no longer applicable.

To address this issue, the present document provides a "power control" scheme that may be implemented by some embodiments as a feasible solution. For example, some embodiments may dynamically increase the transmit power of the grant-free uplink transmission when other low-priority transmissions occupy the grant-free uplink transmission resources, thereby improving the performance of the grant free transmission (e.g., probability of successful transmission). The present document also provides how to implement such a power control, which includes describing signaling formats supporting the above power control scheme, and how this power control scheme (e.g., a multiplexing-based service power control) is effectively integrated with the existing power control modes.

First Embodiment

This embodiment describes a downlink control information (DCI) format 101 for indicating power control information. The power control information is indicated by using the DCI as shown in FIG. 1.

As shown in FIG. 1, the DCI 101 includes two indication fields: a TPC command field 103 and a resource indication field 105. The TPC command field 103 occupies "X" bit(s), where "N" TPC command blocks are included, and each TPC command block occupies "M" bit(s). For example, in some embodiments, "M" can be 2 or 3 which corresponds to the case when one TPC command block contains one TPC command or the case when one TPC command block contains one TPC command and one closed loop indicator. Then, "X" can be greater than or equal to "N*M." When "X>N*M," then the last "(X−N*M)" bits of the TPC command field can be zero-filled. Each TPC command block can be used to indicate a closed-loop power control parameter of a Physical Uplink Shared Channel (PUSCH) or Physical Uplink Control Channel (PUCCH) corresponding to a user equipment (UE).

In some embodiments, the bit sizes for different TPC command blocks in one TPC command field can be different.

As indicated in FIG. 1, the last "Y" bits of the DCI 101 can be the resource indication field 105, and each bit indicates a resource occupation status, for example, more than one set of power control parameters will be predetermined as described in the fourth embodiment. Then, the information in the resource indication field 105 indicating that which one of the plurality of power control parameter sets is selected. The power control parameter set can be selected based on at least one of whether the corresponding grant-free resource is occupied (e.g., by a granted-based service), interference level of the resource, priority level of the transmission on the resource, and a data retransmission status.

In some embodiments, the information in resource indication field can also be used to indicate at least one of: whether the grant-free resource is occupied; high or low interference level of the resource; and high or low priority level of the transmission on the resource; retransmission or first transmission. Then, UE determines which set of power control parameter to use based on the above indication.

In some embodiments, the relationships between the TPC command blocks and the UEs can be determined or calculated based on UE identifications (UE IDs). For example, the UE ID can be used to perform a modulo operation on the number of the TPC command blocks (e.g., adding one to the result) to obtain an index of the TPC command block for an UE in the TPC commands field.

In some embodiments, the relationships between the TPC command blocks and the UEs can be configured by RRC (Radio Resource Control) signaling. For example, in the RRC signaling, the relationships between the TPC command blocks and the UEs can be configured (e.g., when configuring the searching space set of the PDCCH carrying the DCI 101).

In some embodiments, the relationships between the TPC command blocks and the UEs can be configured by (Medium Access Control (MAC) layer signaling. For example, in the MAC signaling, the relationships between the TPC command blocks and the UEs can be configured.

In some embodiments, the relationships between the TPC command blocks and the UEs can be configured by a physical layer signaling. For example, the relationships can be configured in a downlink control information for scheduling a PUSCH for a UE.

Alternatively, in some embodiments, the relationships between the TPC command blocks and the UEs can be determined by any combinations of methods discussed above. For example, for a UE transmitting a grant-based uplink service, the physical layer signaling configuration approach can be used, whereas for a UE transmitting a grant-free uplink service, the RRC signaling configuration approach can be used.

In some embodiments, one TPC command block corresponds to one resource and the TPC command is indicated to multiple UEs which are configured to share the same resource.

In some embodiments, multiple resources are configured to a UE. And at least part of the above multiple resources are need to be indicated in one DCI. Multiple TPC command blocks will correspond to the UE for indicating different power control parameters for each resource. Then the UE needs to check multiple TPC command blocks corresponding to resources configured to it.

Figure 2:
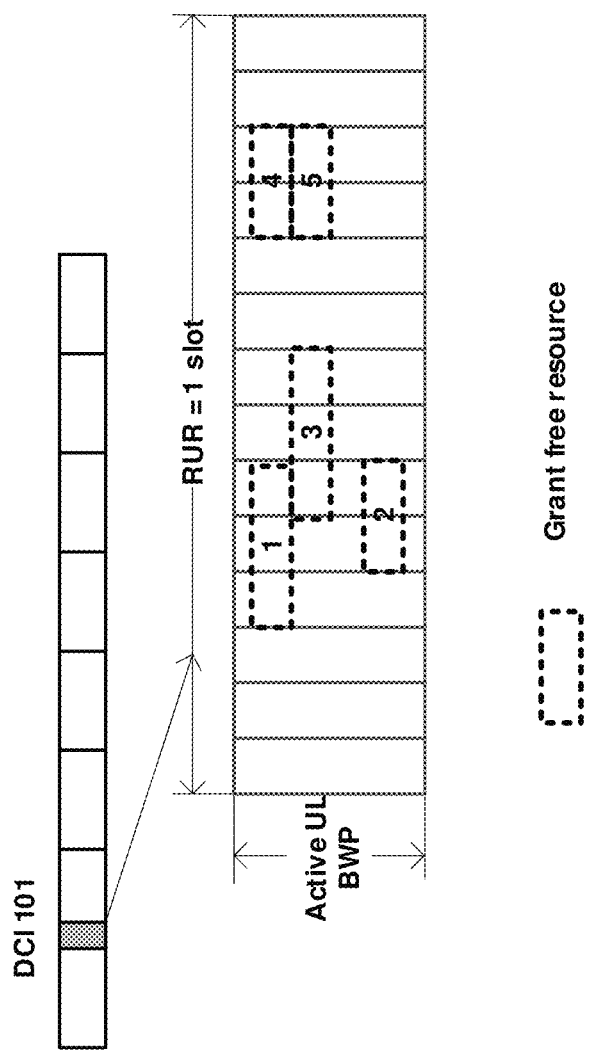
FIG. 2 illustrates another example DCI.

In some embodiments, one TPC command block correspond to one resource, which are shared by multiple UEs. TPC command blocks in one DCI are listed by resource ID in the resource pool shared by multiple UEs. The UE needs to check multiple TPC command blocks corresponding to resources configured to it. As shown in FIG. 2, there are five grant-free resources (i.e., 1-5) comprising a resource pool to be indicated. Accordingly, five TPC command blocks are defined. The mapping relationship between TPC command blocks and the resource can be preconfigured, e.g., TPC command block 1 corresponds to grant-free resource 1, TPC command block 2 corresponds to grant-free resource 2, TPC command block 3 corresponds to grant-free resource 3, TPC command block 4 corresponds to grant-free resource 4, TPC command block 5 corresponds to grant-free resource 5. And grant-free resource 1, 2, 3 are configured to UE1. If UE1 plan to transmit data on one or more resource of grant-free resource 1, 2, 3, then the UE1 needs to check corresponding TPC command block(s).

In some embodiments, the number of bits included in the resource indication field 105 can be determined according to the number of resources to be indicated. For example, assume that the number of grant-free resources configured by RRC signaling is five, and each grant-free resource uses 1 bit to indicate occupation information. Then the resource indication field 105 occupies the last 5 bits of the DCI 101.

In some embodiments, the number of bits included in the resource indication field 105 can also be predetermined or fixed as "Y" bit. When the number of resources required to be indicated is smaller than "Y," the high (or low) bits of the resource indication field 105 can be filled by zero. The relationships between the valid bit (e.g., the resources with non-zero bits in the resource indication field 105) and resources to be indicated can be configured through the RRC signaling, physical layer signaling, Medium Access Control (MAC) layer signaling configuration, or based on suitable predefined rules, so as to map the bits.

As shown in FIG. 2, the DCI 101 is used to indicate the occupation of a grant-free resource in a predefined time-frequency domain resource range (also referred to as a reference uplink resource, RUR). For example, there is one slot in the time domain and the frequency domain is equal to the active uplink bandwidth part (active UL BWP). In this area, as shown in FIG. 2, a total of five grant-free resources are configured. The bit position in the DCI 101 can be determined when the grant-free resource is configured. Specifically, when the grant-free resources are configured for each grant-free UE, the grant-free resource and the bit position in the DCI 101 can be simultaneously indicated. That is, the bit position of the grant-free resource in the DCI 101 can be directly indicated or the bit position of the grant-free resource in the resource indication field 105 can be indicated.

Alternatively, the order of the grant free resources can be defined according to a principle of "time domain first and frequency domain second." The order can be used to define the relationships between the grant-free resource and the bit position in the DCI 101. The five grant-free resources (i.e., 1-5) shown in FIG. 2, are ordered first based on the time domain (e.g., the grant-free resource with earlier starting time has a higher order) and then the frequency domain (e.g., for grant-free resource with the same starting time, higher frequency has a higher order). In some embodiments, the grant-free resources can be ordered differently (e.g., lower frequency has a higher order).

Based on the above principle, the order of the 5 grant-free resources are indicated as 1, 2, 3, 4, and 5, as shown in FIG. 2. If the resource indication field 105 contains 5 bits, then the grant-free resources 1-5 correspond to the highest bit to the lowest bit in the resource indication field 105. In some other embodiments, the order of the grant free resources can also be defined according to a principle of "frequency domain first and time domain second." In this manner, the UE needs to know not only its own grant-free resource configuration, but also the configuration of all grant-free resources in the time-frequency resource range indicated by the DCI 101, so as to obtain the order of all the grant free resources.

Accordingly, the bit positions of the grant free resources corresponding to the UE in the resource indication field 105 can be determined.

In the first embodiment, the grant-free resources of the UEs are separately configured, and the grant-free resources can be orthogonal to one another (that is, there is no overlap), or overlap one another. In some embodiments, the dimension of the time-frequency domain of each grant-free resource can be the same. In some embodiments, the dimension of the time-frequency domain of each grant-free resource can be different.

Second Embodiment

In this embodiment, a Radio Network Temporary Identifier (RNTI) for cyclic redundancy check bit corresponding to the DCI 101 is defined.

The RNTI, e.g. TPC-CGPUSCH-RNTI (e.g., "CG" stands for "Configured Grant"), which is different from the existing TPC-PUSCH-RNTI or TPC-PUCCH-RNTI, is used to scramble the cyclic redundancy check bits corresponding to the DCI 101. The RNTI is defined for the DCI used for power control on configured grant resources. In some embodiments, the physical downlink control channel (PDCCH) carrying the DCI 101 can have the same DCI size as the existing DCI format (e.g., DCI format 2_2). In some embodiments, the terminal can identify that the currently detected PDCCH carries the DCI 101 from other DCIs by using different RNTIs.

Third Embodiment

This embodiment describes a grant-free resource occupation indication method.

In the first embodiment, information in resource indication field regarding which set of power control parameters is used uses 1 bit. The information in the resource indication field can also indicate at least one of: whether the grant-free resource is occupied; high or low interference level of the resource; high or low priority level of the transmission on the resource; retransmission or first transmission. One way is to use 1 bit for such indication. For example, "0" represents the corresponding resource is not occupied, and "1" represents the corresponding resource is occupied. In some embodiments, such information can be multiple bits.

Method 1:

For each grant free resource, it can be divided into equal number of sub-resource blocks for more detailed indication. For example, if a grant-free resource occupies 2 symbols in the time domain and 8 resource blocks (RBs) in the frequency domain, the grant-free resource can allocate four sub-resource blocks (of 1 symbol*4 RB), and use 4 bits to perform resource occupation indication.

Method 2:

For each grant free resource, multiple bits can be used to indicate a status that the grant-free resource is occupied. For example, 2 bits can be used to indicate an occupancy ratio of the grant-free resource. In this example, "00" means that the grant free resource is not occupied. "01" means that the grant free resource is occupied, and the occupancy ratio is less than 1/3. "10" represents that the grant free resource is occupied, and the occupancy ratio is between 1/3 and 2/3. "11" means that the grant free resource is occupied, and the occupancy ratio is greater than 2/3.

Fourth Embodiment

This embodiment describes a method for determining a power control parameter by a UE according to the DCI 101.

More than one set of power control parameters are predefined and based on whether the grant-free resource indicated by the resource indication field 105 is occupied, which set of power control parameters to apply can be determined.

Method 1:

Two sets of open-loop power control parameters {P0, α}#1 and {P0,α}#2 can be defined. For example, in {P0, α}#1, P0 (e.g., target received power) can be "−106 dBm," and a (e.g., path loss compensation factor) can be "0.8." In {P0,α}#2, P0 can be "−100 dBm," and a can be "1." {P0,α}#1 corresponds to the grant-free resource not being occupied by other uplink transmissions, and {P0,α}#2 corresponds to the grant-free resource that has been occupied by other uplink transmissions.

When a certain UE receives the DCI 101 and recognizes that the grant-free resource is occupied in the resource indication field 105, {P0,α}#2 is then applied to determine the power of PUSCH for transmitting the grant-free resource.

In some embodiments, the information in resource indication field is used to indicate which set of power control parameters to be used directly. For example, each bit in resource indication field indicates which set of power control parameters to be used for the corresponding grant free resource.

At this time, the power determined by applying {P0,α} #2 for the PUSCH transmission is higher than the power determined by applying {P0,α} #1, thereby improving the transmission performance when the transmission resources are overlapped.

In such embodiment, the TPC command field can be used to further indicate a set of closed-loop power control parameters. In some embodiments, the above two sets of open-loop power control parameters can associate with the same set of closed-loop power control parameters.

In some embodiments, the DCI can include no TPC command field. In other words, the foregoing uplink transmission does not need to perform a closed-loop power control parameter adjustment.

Method 2:

Two sets of closed-loop power control parameters TPC #1 and TPC #2 corresponding to different TPC tables are defined. For example, the mapping relationship between the corresponding closed-loop power adjustment amount and the TPC command value in TPC #1 is as shown in Table 1 below. The accumulated power adjustment amount refers to an amount of further adjustment of the transmission power from the last PUSCH. The absolute power adjustment amount refers to the absolute amount of power adjustment, which is independent from the previous closed-loop power adjustment. Specifically, when the TPC command is used to indicate the absolute power adjustment amount and when the two-bit TPC command is "00," the representative transmission power is decreased by 4 dB. When the two-bit TPC command is "01," the representative transmission power is decreased by 1 dB. When the two-bit TPC command is 11, it means that the transmission power is increased by 4 dB.

TABLE 1

| TPC Command | Accumulated power adjustment amount (dB) | Absolute power adjustment amount (dB) |
|---|---|---|
| 00 | −1 | −4 |
| 01 | 0 | −1 |

TABLE 1-continued

| TPC Command | Accumulated power adjustment amount (dB) | Absolute power adjustment amount (dB) |
|---|---|---|
| 10 | 1 | 1 |
| 11 | 3 | 4 |

Correspondingly, the mapping relationship between the corresponding closed-loop power adjustment amount and the TPC command value in TPC #2 is shown in Table 2.

TABLE 2

| TPC Command | Accumulated power adjustment amount (dB) | Absolute power adjustment amount (dB) |
|---|---|---|
| 00 | −3 | −9 |
| 01 | 0 | −3 |
| 10 | 3 | 3 |
| 11 | 7 | 9 |

TPC #1 corresponds to embodiments where the gran-free resource is not being occupied by other uplink transmissions. TPC #2 corresponds to embodiments where the grant-free resource has been occupied by other uplink transmissions. When a certain UE receives the DCI 101 and recognizes that the grant-free resource is occupied in the resource indication field 105, TPC #2 is selected. The power adjustment amount can be determined based on the TPC command corresponding to the UE in the TPC command field 103.

TPC #2 is configured with a larger power adjustment step size than TPC #1. For the same TPC command (e.g., take its value), the power adjustment using TPC #2 will be greater than the power adjustment using TPC #1.

In some embodiments, one of TPC tables can be defined with only positive step size. An example is showed in Table 3. So that it can be used for boosting the transmission power for the case of resource occupied by other transmission, or high interference level of the resource, or high priority level of the transmission on the resource, or data retransmission on the resource.

TABLE 3

| TPC Command | Accumulated power adjustment (dB) | Absolute power adjustment amount (dB) |
|---|---|---|
| 00 | 2 | 3 |
| 01 | 4 | 6 |
| 10 | 6 | 9 |
| 11 | 8 | 12 |

In some embodiments, the DCI can use a DCI format for a group common TPC commands or the DCI Format 2_2. The closed loop indicator in the DCI can be used to indicate which closed loop parameter table is used, and the closed loop parameter table is a TPC table with multiple power adjustment step size candidates or a table with power boosting step size candidates.

TPC #2 table with larger power adjustment step sizes is selected in the cases when the closed loop indicator is set to a positive value compared to the cases when the closed loop indicator is set to zero or when the closed loop indicator is not configured for the TPC command.

In some embodiments, as shown in Table 4, TPC #2 is absolute power adjustment only. Regardless whether accumulated power adjustment mode is configured, power adjustment is not accumulated when TPC #2 table is selected. There are two cases:

the first case is "accumulated power adjustment mode is not configured", i.e. "absolute power adjustment mode is configured", in this case, both TPC #1 and TPC #2 use absolute power adjustment.

the second case is "accumulated power adjustment mode is configured". Even if accumulated power adjustment mode is configured, the absolute power adjustment for TPC #2 is used. So in this case, if TPC #1 is selected, it uses accumulated power adjustment, and the accumulated power adjustment for TPC #1 is based on accumulated power adjustment for previous PUSCH. If TPC #2 is selected, it uses absolute power adjustment, and the absolute power adjustment for TPC #2 is based on the previous PUSCH power determined by TPC #1.

TABLE 4

| TPC Command | Absolute power adjustment amount (dB) |
| --- | --- |
| 00 | 3 |
| 01 | 6 |
| 10 | 9 |
| 11 | 12 |

In some embodiments, the power adjustment step sizes in TPC #2 are configured by RRC or MAC layer signaling.

Method 3:

In the above-mentioned two methods, more than two sets of power control parameters can be defined, and, according to a situation of resource overlap, which set of power control parameters to be used can be determined.

For example, taking closed-loop power control as an example, four sets of closed-loop power control parameters can be defined: TPC #1, TPC #2, TPC #3, and TPC #4 corresponding to 4 different TPC tables. The resource indication field 105 indicates that each grant-free resource is used for more than 1 bit. The resource occupancy ratio, for example, is indicated by 2 bits as follows: "00" means that the grant-free resource is not occupied; "01" means that the grant free resource is occupied, and the occupation ratio is less than 1/3; "10" represents that the grant free resource is occupied, and the occupation ratio is between 1/3 and 2/3; "11" represents that the grant free resource is occupied, and the occupation ratio is greater than 2/3. The relationships between different resource occupancy conditions and power control parameters is shown in Table 5 below.

TABLE 5

| Closed-loop power control parameters | Grant free Whether the resource is occupied | Resource occupancy ratio |
| --- | --- | --- |
| TPC #1 | No | 0 |
| TPC #2 | Yes | 0 ~ 1/3 |
| TPC #3 | Yes | 1/3 ~ 2/3 |
| TPC #4 | Yes | More than the 2/3 |

When an occupied portion of a certain grant-free resource is higher, to ensure the reliability of the grant-free service transmission, the increased power should also be higher. Therefore, in this mode, the closed-loop power control parameters can be determined based on the occupied portion of the grant-free resource.

Method 4:

Two sets of open-loop power control parameters {P0, α}#1 and {P0,α}#2, two sets of closed-loop power control parameters TPC #1 and TPC #2 corresponding to different TPC tables, or two sets of a combination of open-loop power control parameters and closed-loop power control parameters, namely {P0,α, TPC} #1 and {P0,α, TPC} #2 can be defined.

Each TPC command block includes 3 bits, where 1 bit is used to indicate which set of power control parameters is selected (e.g., indicate which TPC table, value of P0 and α are selected), and the other 2 bits of the TPC command block can be used to indicate the power adjustment value of the closed-loop power control. In such embodiments, the DCI 101 does not need to include the resource indication field 105.

Fifth Embodiment

A method for determining a power control parameter by a UE according to the DCI 101 is described in this embodiment.

If the UE identifies that the uplink transmission resource allocated by the UE is partially or completely occupied, based on the indication of the resource indication field 105 in the DCI 101, the UE can drop the transmission power on the corresponding uplink transmission resource to zero. When the uplink transmission resource allocated by the UE is not occupied, the UE can adjust the transmission power based on the corresponding TPC command in the TPC command field 103.

Figure 3:
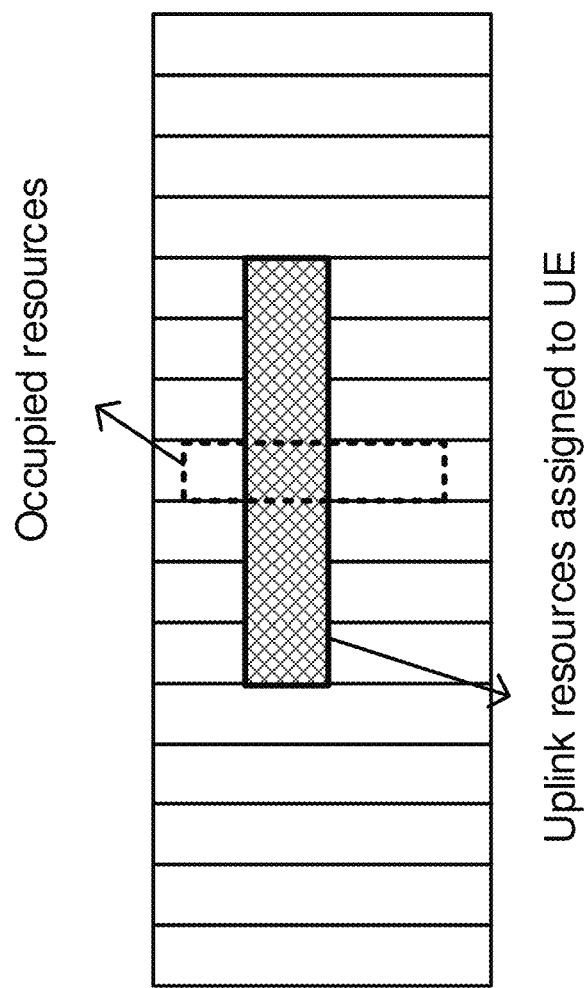
FIG. 3 is a schematic diagram illustrating examples of occupied and assigned resources.

As shown in FIG. 3, the area indicated by the dashed box is an occupied or preempted resource indicated by the resource indication field 105. The grid box is the uplink transmission resource originally allocated to the UE. The UE can reduce the transmission power for the overlapping resource to zero. The transmission power of the uplink transmission resource for the non-overlapping region can be one of the following:

1. Maintain the original transmission power;
2. The original transmit power is maintained on the resource before the overlapping resource; the transmission power is adjusted according to the instruction of the corresponding TPC command in the DCI 101 for the resource after the overlapping resource;
3. In all non-overlapping areas, adopting the adjusted transmit power based on the indication of the corresponding TPC command in the DCI 101;
4. Maintain the original transmit power on the resources before the overlapping resources and reduce the transmission power to zero for the resources after the overlapping resources; and
5. The resources before the overlapping resource is adjusted based on the instruction of the corresponding TPC command in the DCI 101, and the transmission power for the resource after the overlapping resource is reduced to zero.

In some embodiments, one of the foregoing methods for power transmission power in the non-overlapping areas can be defined in the specification. It some embodiments, the methods can be determined by the communication device (e.g., a base station), and indicated to a terminal (e.g., a UE).

Sixth Embodiment

This embodiment describes a combination of (1) a power control based on resource multiplexing and (2) a regular power control.

Method 1:

An effective time window is defined for power control based on resource multiplexing. The effective time window can be the time duration of next configured resource after the time point which is N symbols after the UE receive the DCI. N is a positive integer. Within the effective time window, a power adjustment is performed in the manner described in the embodiments herein. The power control status returns to the status before the DCI is received after the effective time window.

Figure 4:
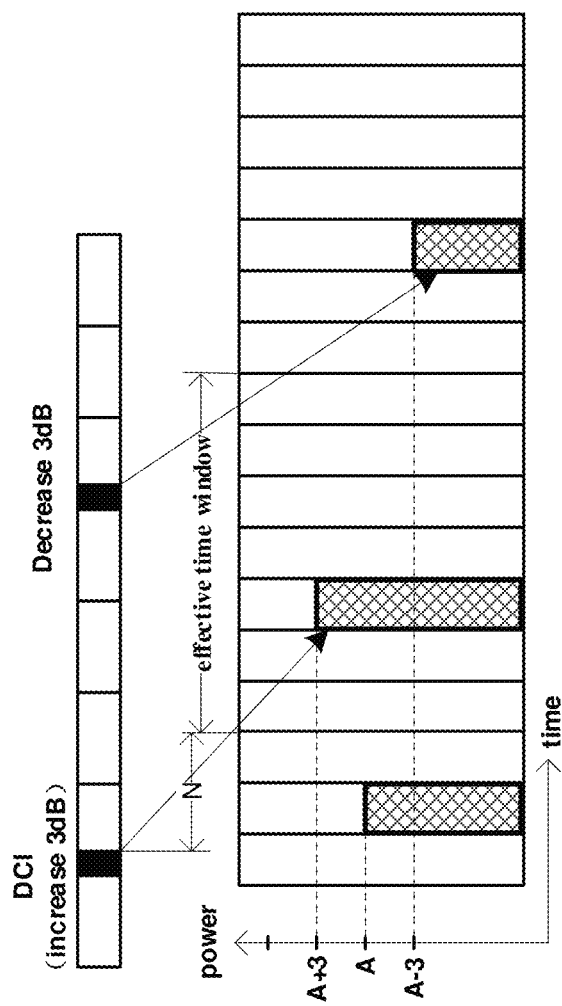
FIGS. 4 and 5 are schematic diagrams illustrating examples of adjusting power based on DCI.

Specifically, as shown in FIG. 4, when the transmit power is adjusted according to the accumulated adjustment amount, the initial transmit power of the UE can be "A." During the effective time window, the transmission power is increased (e.g., 3 dB added from A) due to occurrence of transmission multiplexing with other uplink services. After the effective time window, the UE can receive a new TPC command, instructing it to reduces the 3 dB transmit power (from A). At this time, the UE can adjust the transmission power to "A-3."

In this manner, if the UE receives a plurality of DCIs within the same effective time window and the transmission power adjustment amount is indicated according to the accumulated adjustment amount, the subsequent power adjustment within effective time window is based on the previous transmission power (e.g., not based on the initial transmit power "A").

Method 2:

If the transmission power is adjusted according to the accumulated adjustment amount, then the power adjustment based on the resource multiplexing is valid for the subsequent transmission regardless of whether the next uplink transmission is multiplexed with other uplink services.

Figure 5:
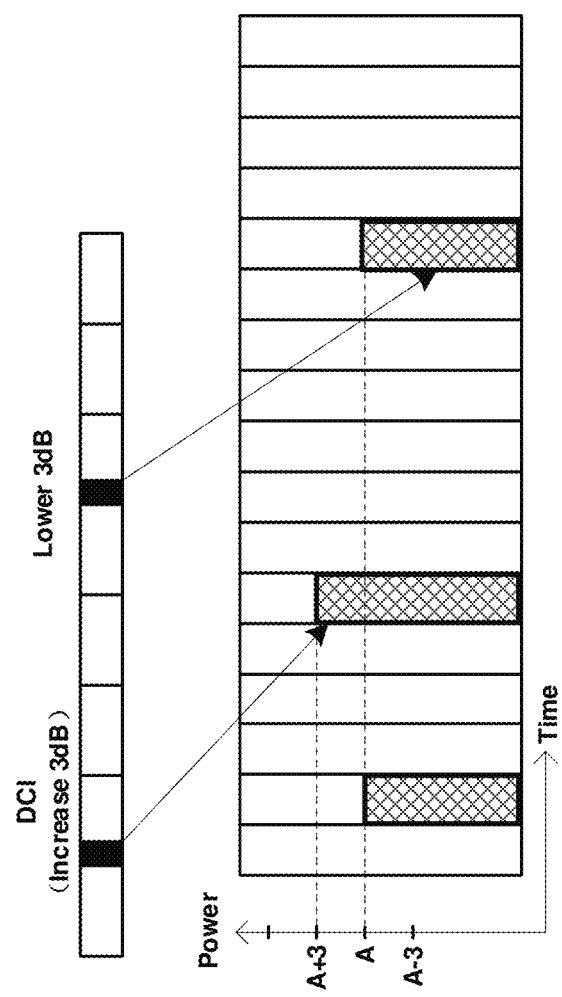

Specifically, as shown in FIG. 5, the original transmit power of the UE is "A." The network side performs a power adjustment based on resource multiplexing according to the DCI. The transmission is multiplexed with other uplink services, so the transmission power is increased 3 dB from A, thus "A+3" dB. The UE then receives a new TPC command, instructing it to reduce the transmission by 3 dB. At this time, the UE should adjust the transmission power to "A."

Method 3:

When the transmit power is adjusted according to the accumulated adjustment amount, the power adjustment parameters based on the resource multiplexing are maintained separately from the regular power control adjustment parameters.

For example, for the power adjustment where there is multiplexing with other uplink transmissions indicated in the resource indication field 105, the previous determination of the transmission power is "A," and the power adjustment when multiplexing with other uplink transmissions next time is based on the previous transmission power which is multiplexing with other uplink transmissions. For example, the TPC command indicates that the increase is 3 dB, the transmission power is then boosted to "A+3" dB. The subsequent power adjustments in case of multiplexing with other uplink transmissions will base on the new power "A+3" dB.

For the power adjustment when there is no multiplexing with other uplink transmissions indicated in the resource indication field 105, the previous determination is that the transmission power is "B" dBm, and the power adjustment when there is no multiplexing with other uplink transmissions next time is based on the previous transmission power which is not multiplexing with other uplink transmissions. For example, the TPC command indicates that the increase is 3 dB, the power is then boosted to "B+3" dBm. The subsequent power adjustment in case of no multiplexing with other uplink transmissions will base on "B+3" dBm.

FIG. 6A shows a flowchart of an example method 600A of wireless communication. The method 600A includes, at block 601, indicating, by a communication device, power control information based on a plurality of parameter sets via downlink control information (DCI). In some embodiments, the power control information is used for indicating transmission power on a resource, and the plurality of parameter sets are predefined for the resource. At block 603, the method 600A includes indicating one selected parameter set from the plurality of parameter sets. The method 600A includes, at block 605, indicating the power control information based on the selected parameter set. In some embodiments, the communication node device includes a base station.

In some embodiments, the plurality of parameter sets includes at least one of open-loop power control parameter and, closed-loop power control parameter. In some embodiments, the resource can include at least a part of grant-free transmission resource or at least a part of grant-based transmission resource.

In some embodiments, the method 600A further includes, selecting, by the communication device, one parameter set from the plurality of parameter sets based on a status of the resource. In some embodiments, the status of the resource includes at least one of: an interference level of the resource, a priority level of the transmission on the resource, and an occupation status of the resource.

In some embodiments, the method 600A further includes, defining a Radio Network Temporary Identifier (RNTI) for the DCI.

In some embodiments, the DCI includes a Transmit Power Control (TPC) command field, and the TPC command field includes one or more TPC command blocks. In some embodiments, the method 600A further includes indicating which one of the plurality of parameter sets is selected via the one or more TPC command blocks. In some embodiments, each of the one or more TPC command blocks can be indicative of a closed-loop power control parameter corresponding to a user equipment.

In some embodiments, the DCI includes a resource indication field. The method 600A further includes determining which one of the plurality of parameter sets is selected based on information in the resource indication field. In some embodiments, a bit width of the resource indication field is determined based on a number of grant free resources in a predefined time-frequency domain resource to be indicated.

In some embodiments, the resource indication field has a predetermined number of bits. In some embodiments, the method 600A further includes configuring the relationship between the bit of resource indication field and indicated resource via at least one of Radio Resource Control (RRC) signaling, Medium Access Control (MAC) layer signaling, physical layer signaling, predefined rules. In some embodiments, the method 600A further includes defining an effective time window for the power control information.

FIG. 6B shows a flowchart of an example method 600B of wireless communication. The method 600 includes defining (block 602), by a communication device, a plurality of control parameter sets. The method 600 includes selecting (block 604) one of the plurality of control parameter sets based on an availability of transmission resources. The method 600B includes using (block 606) Downlink Control Information (DCI) to indicate power control information based on the selected one of the control parameter sets. In some embodiments, the communication node device includes a base station.

In some embodiments, the method 600B further includes defining a Radio Network Temporary Identifier (RNTI) for the DCI. In some embodiments, the method 600B further includes adjusting parameter effective time based on power of resource multiplexing associated with the RNTI.

In some embodiments, the DCI includes a Transmit Power Control (TPC) command field. The TPC command field can include one or more TPC command blocks. The method 600B can include determining whether at least some of the transmission resources are occupied based on the one or more TPC command blocks.

In some embodiments, the one or more TPC commands is indicative of a closed-loop power control parameter corresponding to a UE. In some embodiments, the one or more TPC command blocks is indicative of an open-loop power control parameter corresponding to a user equipment.

In some embodiments, the one or more TPC commands is indicative of a power control parameter of a Physical Uplink Control Channel (PUCCH) corresponding to a UE. In some embodiments, the one or more TPC command blocks is indicative of a power control parameter of a Physical Uplink Shared Channel (PUSCH) corresponding to a UE.

In some embodiments, the method 600B further includes determining whether at least some of the transmission resources are occupied based at least in part on Radio Resource Control (RRC) signaling. In some embodiments, the method 600B further includes determining whether at least some of the transmission resources are occupied based at least in part on physical layer signaling. In some embodiments, the method 600B further includes determining whether at least some of the transmission resources are occupied based at least in part on Medium Access Control (MAC) layer signaling.

In some embodiments, the DCI includes a resource indication field. The method 600B includes determining whether at least some of the transmission resources are occupied based on information in the resource indication field. In some embodiments, a bit number of the resource indication field is determined based on a number of grant free resources to be indicated. In some embodiments, the resource indication field has a predetermined number of bits.

In some embodiments, the DCI is indicative of whether at least some of the transmission resources are occupied in a predefined time-frequency domain resource range. For example, the DCI, in a predefined time-frequency domain resource field, can indicate that at least some of the transmission resources are occupied. In some embodiments, the DCI is indicative of whether at least some of the transmission resources are occupied in a Reference Uplink Resource (RUR). For example, the DCI, in a RUR field, can indicate occupancy statuses of at least some of the transmission resources.

Figure 7:
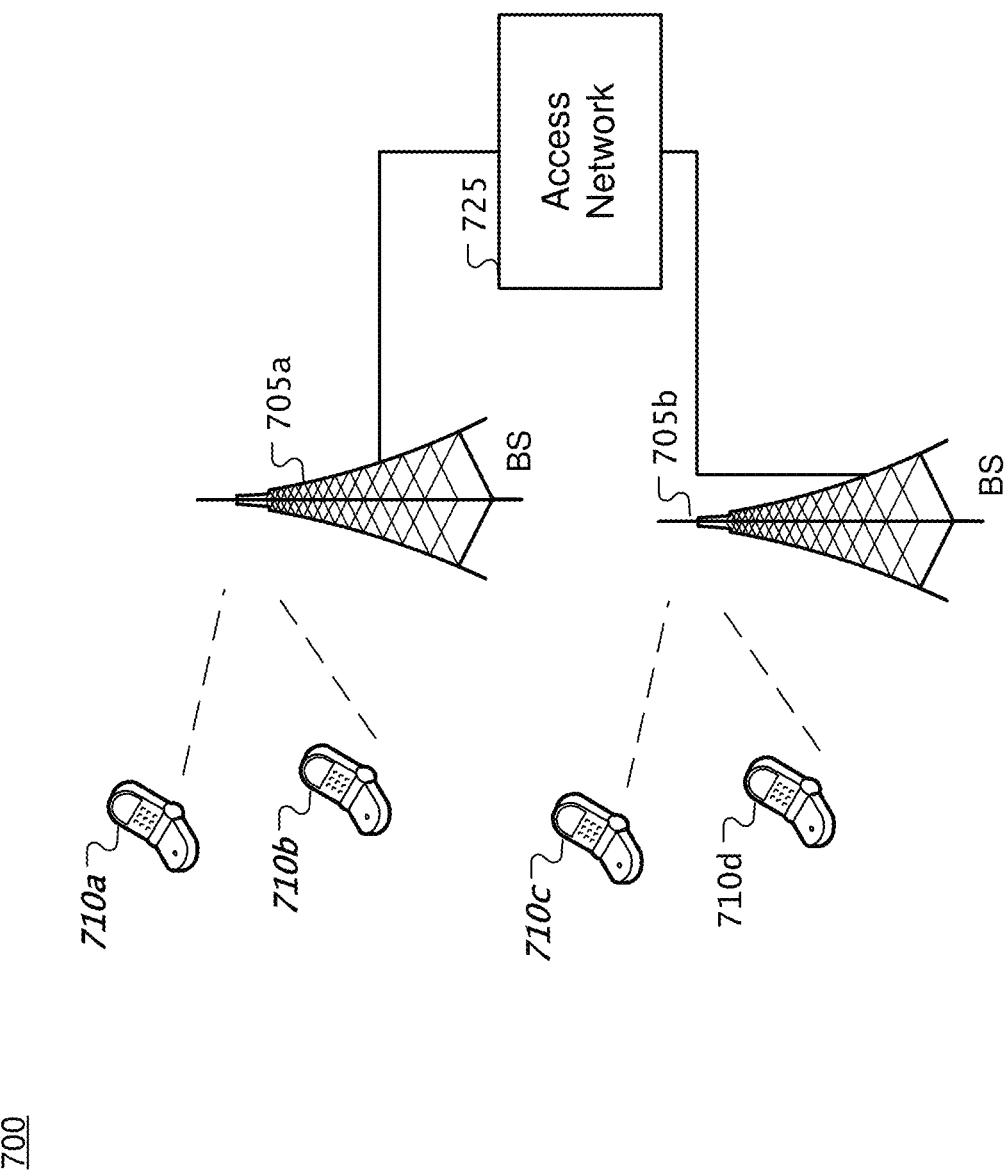
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 700 can include one or more base stations (BSs) 705a, 705b, one or more wireless devices (e.g., UEs or terminals) 710a, 710b, 710c, 710d, and an access network 725. Base stations 705a, 705b can provide wireless service to wireless devices 710a, 710b, 710c and 710d in one or more wireless sectors. In some implementations, a base station 705a or 705b includes directional antennas to produce two or more directional beams to provide wireless coverage in different sectors.

The access network 725 can communicate with one or more base stations 705a, 705b. In some implementations, the access network 725 includes one or more base stations 705a, 705b. In some implementations, the access network 725 is in communication with a core network (not shown in FIG. 7) that provides connectivity with other wireless communication systems and wired communication systems. The core network may include one or more service subscription databases to store information related to the subscribed wireless devices 710a, 710b, 710c and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The access network 725 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 8:
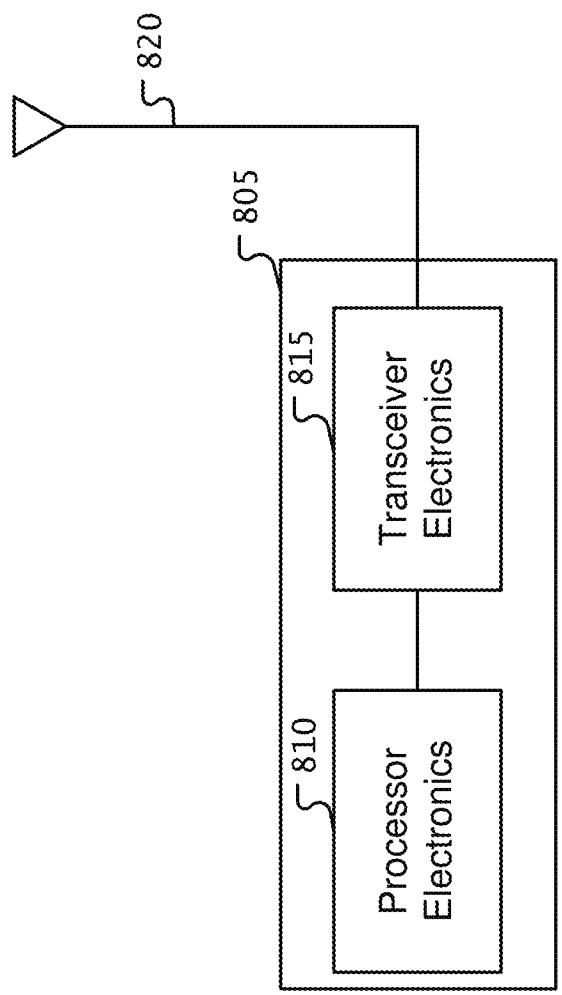
FIG. 8 is a block diagram representation of a portion of a radio station.

FIG. 8 is a block diagram representation of a portion of a radio station (e.g., a type of wireless communication node). A radio station 805 such as a base station or a terminal (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. The radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document. From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of wireless communication, comprising:
   selecting, by a communication device, a parameter set from a plurality of parameter sets, wherein at least one of the plurality of parameter sets includes an open-loop power control parameter;
   configuring, by the communication device, information in a resource indication field of downlink control information (DCI) based on the parameter set selected from the plurality of parameter sets;
   indicating, by the communication device, to a terminal, the parameter set selected from the plurality of parameter sets via transmitting the DCI; and
   receiving, by the communication device, transmission on one or more resources from the terminal, wherein transmission power on the one or more resources is based on the parameter set selected from the plurality of parameter sets,
   wherein the information in the resource indication field of the DCI includes one or two bits to be used by the terminal to determine which one of the plurality of parameter sets is selected,
   wherein a first power value of the plurality of parameter sets is selected to determine the transmission power in a case that the one or two bits of the resource indication field of the DCI have a first value, and a second power value of the plurality of parameter sets is selected to determine the transmission power in a case that the one or two bits of the resource indication field of the DCI have a second value.

2. The method of claim 1, wherein the DCI includes a resource indication field, and wherein the method comprises determining which one of the plurality of parameter sets is selected based on information in the resource indication field.

3. The method of claim 1, wherein the communication device includes a base station.

4. An apparatus for wireless communication that carries out a method of wireless communication, the method comprising:
   selecting a parameter set from a plurality of parameter sets, wherein at least one of the plurality of parameter sets includes an open-loop power control parameter;
   configuring information in a resource indication field of downlink control information (DCI) based on the parameter set selected from the plurality of parameter sets;
   indicating the parameter set selected from the plurality of parameter sets via the DCI to a terminal; and
   receiving, by the apparatus, transmission on one or more resources from the terminal, wherein transmission power on the one or more resources is based on the parameter set selected from the plurality of parameter sets,
   wherein the information in the resource indication field of the DCI includes one or two bits to be used by the terminal to determine which one of the plurality of parameter sets is selected,
   wherein a first power value of the plurality of parameter sets is selected to determine the transmission power in a case that the one or two bits of the resource indication field of the DCI have a first value, and a second power value of the plurality of parameter sets is selected to determine the transmission power in a case that the one or two bits of the resource indication field of the DCI have a second value.

5. The apparatus of claim 4, wherein the DCI includes a resource indication field, and wherein the method comprises determining which one of the plurality of parameter sets is selected based on information in the resource indication field.

6. The apparatus of claim 4, wherein the apparatus for wireless communication includes a base station.

7. A method of wireless communication, comprising:
receiving, by a terminal, an indication corresponding to a parameter set selected from a plurality of parameter sets via downlink control information (DCI), wherein at least one of the plurality of parameter sets includes an open-loop power control parameter;
determining transmission power on one or more resources based on the selected parameter set; and
performing a transmission to a communication device on the one or more resources with the determined transmission power,
wherein the DCI includes a resource indication field, and wherein the method comprises determining which one of the plurality of parameter sets is selected based on one or two bits of information in the resource indication field of the DCI,
wherein a first power value of the plurality of parameter sets is selected to determine the determined transmission power in a case that the one or two bits of the resource indication field of the DCI have a first value, and a second power value of the plurality of parameter sets is selected to determine the determined transmission power in a case that the one or two bits of the resource indication field of the DCI have a second value.

8. The method of claim 7, wherein the DCI includes a resource indication field, and wherein one of the plurality of parameter sets is selected based on information in the resource indication field.

9. The method of claim 7, wherein the terminal includes user equipment (UE).

10. An apparatus for wireless communication that carries out a method of wireless communication, the method comprising:
receiving an indication corresponding to a parameter set selected from a plurality of parameter sets via downlink control information (DCI), wherein at least one of the plurality of parameter sets includes an open-loop power control parameter;
determining transmission power on one or more resources based on the selected parameter set; and
performing a transmission to a communication device on the one or more resources with the determined transmission power,
wherein the DCI includes a resource indication field, and wherein the method comprises determining which one of the plurality of parameter sets is selected based on one or two bits of information in the resource indication field of the DCI,
wherein a first power value of the plurality of parameter sets is selected to determine the determined transmission power in a case that the one or two bits of the resource indication field of the DCI have a first value, and a second power value of the plurality of parameter sets is selected to determine the determined transmission power in a case that the one or two bits of the resource indication field of the DCI have a second value.

11. The apparatus of claim 10, wherein the DCI includes a resource indication field, and wherein one of the plurality of parameter sets is selected based on information in the resource indication field.

12. The apparatus of claim 10, wherein the apparatus for wireless communication includes user equipment (UE).

* * * * *